.6860X
L. Hale,
Cotton Press.
Patented Dec. 12, 1831.
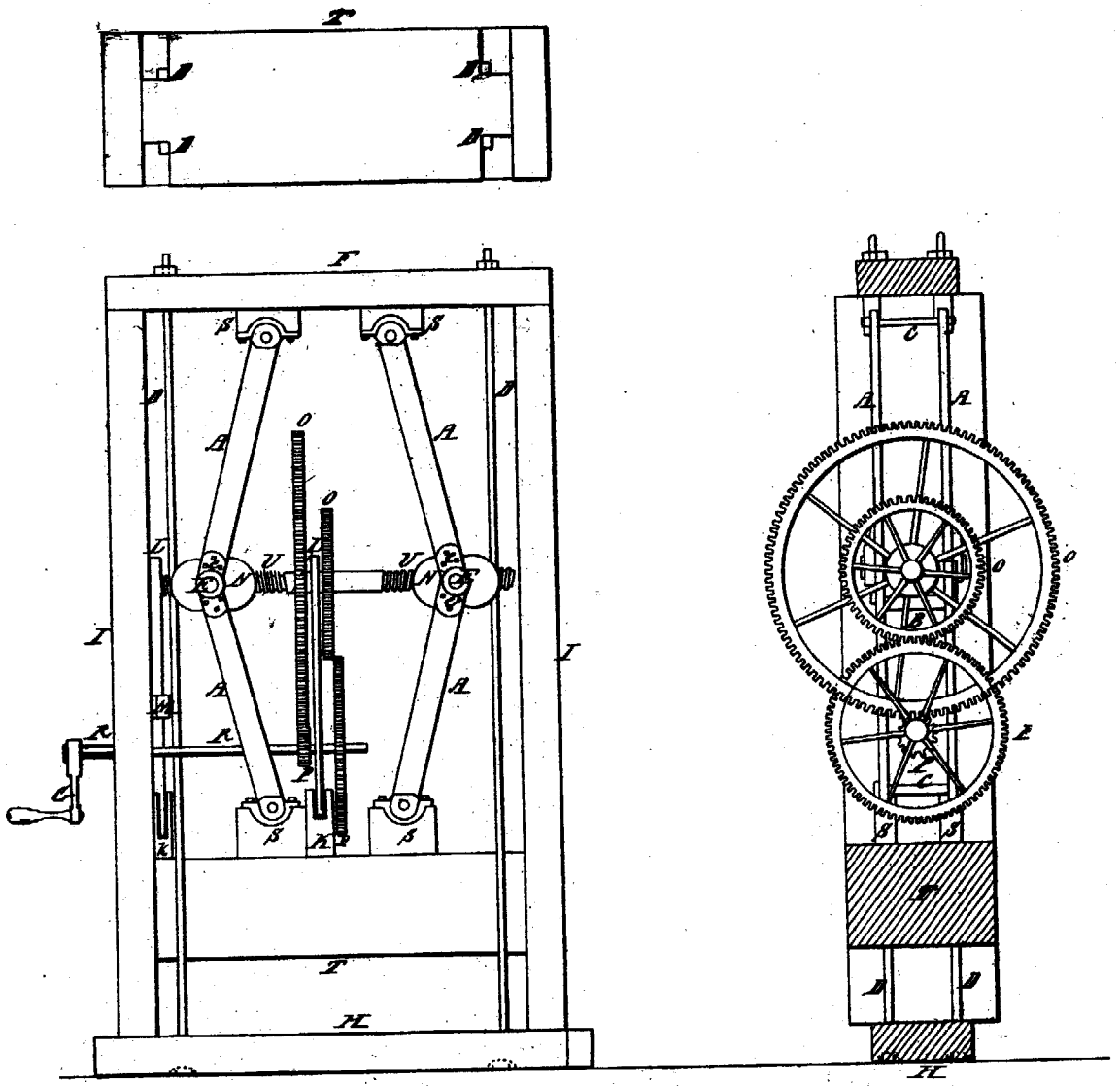

Luke Hale. of Hollis State of New Hampshire—

Letters Patent.

The schedule referred to in these Letters Patent and making part of the same containing a description in the words of the said Luke Hale himself of his improvement in the standing Press called the "Toggle joint screw Press"

To all persons to whom these presents shall come.

Luke Hale, of Hollis, County of Hillsborough and State of New Hampshire. Machinist sends greeting:

Be it known that I Luke Hale have invented constructed made and applied to use a new and useful improvement in the standing Press, called the "Toggle joint screw press" which I specify and describe in my own words viz,—

The said Press for common use is about eight feet high, four and a half feet wide, and one and a half feet deep; the bed piece about twelve inches, and the posts four and a half inches thick. The posts are framed into the bed piece and beam, by double tenons well fitted to double mortises, made in the bed piece and beam. into which mortises the tenons are forced and there confined by four iron bolts passing up through the bed piece and beam having strong heads at the lower end, and [illegible] nuts screwed on the upper end of each bolt. These bolts bind the Press firmly together The platten is in length and breadth equal to the width and depth of the frame, and about one foot thick. It has a tenon on each end, exactly fitted so as to slide up and down between the said iron bolts which serve for guides to the platten as well as for efficient supports to resist the power of the press.

There are four boxes having half round grooves to receive the heads of the toggles two of which are made fast to the under side of the beam; and the upper two to the upper side of the platten. They are placed at such distances from the ends as to render the power of the toggles as equal as possible on every part of the beam and platten. On the left hand box on the platten is a flange rising about three or four inches high to guide the lower end of a sling to be described. Each box has a cap with half round groove matching the groove in the box, the caps are made fast to the boxes by bolts or screws. I use two toggle joints in upright positions between the beam and platten, they are made wide with double bars. The bars are connected at

6860X the extreme ends by a round bolt or pivot fitted to the said boxes by which the toggles
are connected with and suspended to the beam with all their appendages. Within about
three inches of the centre joint of the toggles the side bars have another union by a square
bar extending from one side to the other. The inner ends of the side bars are excavated
about one third part of a circle fitted to play on pivots to be mentioned hereafter,
on the outside of each side bar is a flat hinge which holds the excavated faces of the
of the side bars of the toggles to the above mentioned pivots. These pivots are formed one on
each opposite edge of a strong nut of an oblong spheroid form placed in the centre
of each toggle. The nuts are well fitted on a screw about two and a half inches in di
ameter, and just long enough to reach from the inside of one post to the inside of the
other. This screw is the grand moving principle. It is made with a square thread
right-handed, at one end and left handed at the other end, so that the toggle joints
may approach to or recede from each other as the screw is made to revolve, one way
or the other. On the centre of this screw is made fast a dentated wheel about
eighteen inches in diameter, on the right hand of which and close to it is made fast
another dentated wheel nearly three feet in diameter, and on the left hand side
of which is swivelled the upper end of a flat sling extending down to the platten,
when it is raised to its highest point there entering the above mentioned flange or
hollow stud which rises so high as to retain the end of the sling when the platten is
at its lowest point. On the right hand end of the said screw and touching the right post
is swivelled another sling extending downwards, the lower end of which passes
through a staple or bridge screwed to the post; the crank arbor with its appen
-dages is placed directly below and parallel to the said screw, on the right hand
end is a pivot long enough to reach through the pivot hole in the lower end
of the sling, through the post mortised for that purpose, and receive a crank on the
end. At the other end it has a long pivot which plays in a pivot hole, in the
lower end of the left hand sling; and it has so much end chase, that it may at
option be slid one way and the other about two or three inches for the purpose of
shifting the gearing. Close to the shoulder of the pivot on the left hand end of
the arbor is made fast a small wheel, so calibred as to mesh into the smaller
wheel on the said screw. About two or three inches to the right of said small
wheel on the same arbor is made fast a small pinion of eight or ten leaves
calibred to mesh into the larger wheel on ~~on~~ the said screw, by which 6860X [illegible]

means the operator can apply a smaller or greater power, or operate with a greater or less speed at option

What I claim as my invention and improvement, is the application of the right and left handed screw by which the toggle joints are put into action, all other parts being common. In testimony that the above is a true specification of my said improvement I hereunto set my hand and seal this 29th day of November in the year of our Lord one thousand eight hundred and thirty one

Witnesses

John Dwight
Augustus Peabody

Luke Hale.

Exd
Ch.J.W.